A. BYRD.
STOCK TAG.
APPLICATION FILED APR. 11, 1916. RENEWED MAR. 28, 1918.
1,282,750.  Patented Oct. 29, 1918.
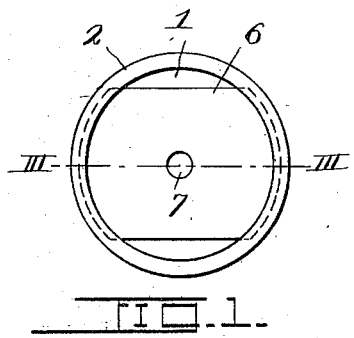
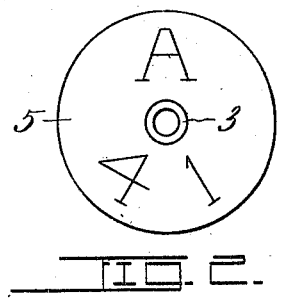
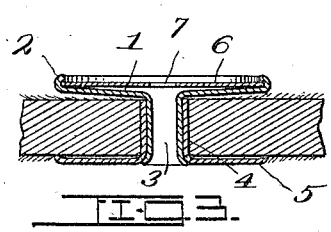
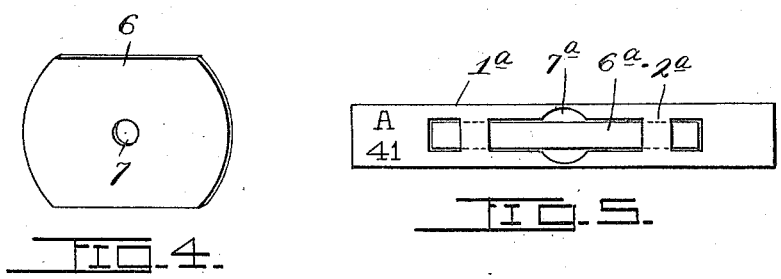
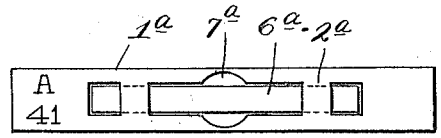
WITNESSES:
INVENTOR:
Atwill Byrd,
BY
ATTORNEY.

UNITED STATES PATENT OFFICE.

ATVILL BYRD, OF KANSAS CITY, MISSOURI.

STOCK-TAG.

1,282,750. Specification of Letters Patent. Patented Oct. 29, 1918.

Application filed April 11, 1916, Serial No. 90,396. Renewed March 28, 1918. Serial No. 225,367.

*To all whom it may concern:*

Be it known that I, ATVILL BYRD, a citizen of the United States, residing at Kansas City, in the county of Jackson and State of Missouri, have invented certain new and useful Improvements in Stock-Tags, of which the following is a specification.

My invention relates to stock tags, and an important feature resides in a removable colored label, or other colored identifying means to indicate a certain period of time in which stock was tested for disease.

Owing to stringent laws requiring periodical examination of dairy and beef cattle for disease, it is customary to mark the tested animals with ear tags or other means of identification to distinguish them from untested animals. The tags are numbered and a record is kept by the proper authorities with a description of the animals bearing the respective tags, together with the time each animal was tested. Most State laws require annual testing of each animal and semiannual testing of animals that have been recently exposed to disease. However, changes frequently occur in herds and it then becomes necessary to test the new comers. Here is where considerable unnecessary labor is imposed upon the official making the examination. As the tags are alike in appearance the new and old members of the herd can only be distinguished apart by securing them in stanchions in order that the identifying numbers on the tags can be read. Thus the entire herd must be closely inspected with its attendant labor, loss of time, and chances for making mistakes.

By using my colored label it is unnecessary to hold each animal to read the number on its tag, as the color of the label indicates the calendar year or other period of time in which the animal was tested. The color being visible at a distance, renders inspection of a herd quite easy, as the inspector may station himself at a gate through which the herd is driven, in order to determine at a glance what stock if any should be tested.

When the time limit for a test expires the old label is replaced with one of a different color at the time of making the new test, hence it is to be understood that a different colored label is used to indicate each period of time for which a new test is made.

In some cases the label may contain two colors to indicate that the animal has been exposed, for instance in a public stock yard, before the expiration of the period of time for which it was originally tested.

The tag itself may be made in various forms, but embodies means for removably holding in place, so that different colored labels to indicate different periods of time can be readily substituted for each other.

Referring now to the accompanying drawing:

Figure 1 is a front elevation of one embodiment of the invention.

Fig. 2 is a rear elevation thereof.

Fig. 3 is a cross section on line III—III of Fig. 1.

Fig. 4 is a detail perspective of the colored identifying member.

Fig. 5 shows another embodiment of the invention.

Referring in detail to the several parts, 1 designates a member provided with a peripheral flange 2 and a centrally-disposed tubular stem 3, which latter is adapted to extend through the tubular shank 4 of a disk 5, and be clenched against the back of the latter as disclosed by Fig. 3.

6 designates the colored identifying member which is removably held in place by the flange 2. The identification member or label 6 is made of any suitable material which can be placed in position under the flange 2 and removed therefrom. In order to facilitate the insertion and removal of the colored member 6 the same is made with a central aperture 7 through which a suitable instrument may be inserted to engage the underside thereof to spring it outward from the engaging flange 2.

In practice, the device is, preferably, applied to the animal's ear which is pierced to admit the passage of the tubular shank 4, after which the tubular stem 3 is passed through said shank 4 and crimped to permanently retain it in place. When the term indicated by a certain colored label 6 expires, said label is removed from the device and a different colored label is substituted therefor. The shank 4 shoulders against the back of the member 1 and prevents it from being drawn close enough to member 5 during the crimping of the stem 3, to pinch the ear of the animal.

As disclosed by Fig. 2, the member 5 contains a number and such other data as may be desired to identify the particular animal to which the device is applied and which is entered on the records kept by the officials having charge of such matters.

Fig. 5 shows a link form of device adapted to be passed through a slit in the animal's ear and bent in the form of a link.

The identification means $6^a$ is removably held in a counter-sunk portion $2^a$ of the member $1^a$ by transverse members $2^a$. Recesses $7^a$ are provided in the member $1^a$ for the insertion of a suitable instrument beneath the identification member $6^a$, so that the same can be removed and replaced by another bearing a different color. One side of the member 1 bears an identification member as disclosed on the drawing.

Other forms of tags may be employed without departing from the spirit or scope of the invention as set forth in the accompanying claim.

Having thus described my invention, what I claim and desire to secure by Letters Patent, is:

A tag for live stock composed of a disk-like member having a peripheral flange and having an integral tubular stem, a disk having a central hole and a tubular shank surrounding the hole and engaged over the stem, said stem having its free outer end turned outwardly to engage the disk, and a label engaged with the flange and having a central hole which registers with the tubular stem to allow an instrument to engage through the label hole and into the stem to remove the label.

In testimony whereof I affix my signature in the presence of two witnesses.

ATVILL BYRD.

Witnesses:
F. G. FISCHER,
L. J. FISCHER.

Copies of this patent may be obtained for five cents each, by addressing the "Commissioner of Patents, Washington, D. C."